US012594718B2

(12) United States Patent
Mordechay et al.

(10) Patent No.: US 12,594,718 B2
(45) Date of Patent: Apr. 7, 2026

(54) LEVELING SYSTEM FOR THREE-DIMENSIONAL PRINTING

(71) Applicant: Stratasys Ltd., Rehovot (IL)

(72) Inventors: Dan Mordechay, Mazkeret Batya (IL); Barak Glassman, Ness Ziona (IL); Kiril Lain, Rehovot (IL)

(73) Assignee: Stratasys Ltd., Rehovot (IL)

( * ) Notice: Subject to any disclaimer, the term of this patent is extended or adjusted under 35 U.S.C. 154(b) by 416 days.

(21) Appl. No.: 17/921,123

(22) PCT Filed: Apr. 27, 2021

(86) PCT No.: PCT/IL2021/050487
§ 371 (c)(1),
(2) Date: Oct. 25, 2022

(87) PCT Pub. No.: WO2021/220274
PCT Pub. Date: Nov. 4, 2021

(65) Prior Publication Data
US 2023/0173753 A1     Jun. 8, 2023

Related U.S. Application Data

(60) Provisional application No. 63/015,728, filed on Apr. 27, 2020.

(51) Int. Cl.
*B29C 64/218*     (2017.01)
*B29C 64/112*     (2017.01)
(Continued)

(52) U.S. Cl.
CPC .......... *B29C 64/218* (2017.08); *B29C 64/112* (2017.08); *B29C 64/209* (2017.08); *B29C 64/35* (2017.08); *B29C 64/386* (2017.08); *B33Y 40/00* (2014.12); *B33Y 30/00* (2014.12); *B33Y 50/00* (2014.12)

(58) Field of Classification Search
CPC ........ B29C 64/00; B29C 64/218; B29C 64/35
See application file for complete search history.

(56) References Cited

U.S. PATENT DOCUMENTS 6,259,962 B1    7/2001    Gothait
6,569,373 B2    5/2003    Napadensky
(Continued)

FOREIGN PATENT DOCUMENTS

EP        2636513        9/2013
EP        2636513 A1 *   9/2013    ........... B29C 64/112
(Continued)

OTHER PUBLICATIONS

Communication Pursuant to Article 94(3) EPC Dated Feb. 27, 2024 From the European Patent Office Re. Application No. 21726207.0. (7 Pages).
(Continued)

*Primary Examiner* — John J DeRusso

(57)     ABSTRACT
A leveling system for a three-dimensional printing system, comprises a rotatable roller, a waste collecting bath, a blade for removing liquid waste from the roller into the bath, and a plurality of tubular structures. Each tubular structure has an inlet at a vicinity of a base of the bath and an outlet connectable to a pump system.

20 Claims, 14 Drawing Sheets

(51) Int. Cl.

| | |
|---|---|
| *B29C 64/209* | (2017.01) |
| *B29C 64/35* | (2017.01) |
| *B29C 64/386* | (2017.01) |
| *B33Y 30/00* | (2015.01) |
| *B33Y 40/00* | (2020.01) |
| *B33Y 50/00* | (2015.01) |

(56) References Cited

U.S. PATENT DOCUMENTS

| | | | | |
|---|---|---|---|---|
| 6,658,314 | B1 | 12/2003 | Gothait | |
| 6,850,334 | B1 | 2/2005 | Gothait | |
| 7,183,335 | B2 | 2/2007 | Napadnsky | |
| 7,209,797 | B2 | 4/2007 | Kritchman et al. | |
| 7,225,045 | B2 | 5/2007 | Gothait et al. | |
| 7,300,619 | B2 | 11/2007 | Napadensky et al. | |
| 7,479,510 | B2 | 1/2009 | Napaensky et al. | |
| 7,500,846 | B2 | 3/2009 | Eshed et al. | |
| 7,962,237 | B2 | 6/2011 | Kritchman | |
| 8,784,723 | B2 | 7/2014 | Napadensky | |
| 9,031,680 | B2 | 5/2015 | Napadensky | |
| 2005/0104241 | A1* | 5/2005 | Kritchman | B33Y 10/00 |
| | | | | 425/375 |
| 2011/0147993 | A1 | 6/2011 | Eshed et al. | |
| 2015/0360417 | A1* | 12/2015 | Kritchman | B29C 64/232 |
| | | | | 264/308 |
| 2017/0057161 | A1* | 3/2017 | Kuk | B33Y 50/02 |
| 2018/0065293 | A1* | 3/2018 | Jeon | B29C 64/112 |
| 2018/0215079 | A1* | 8/2018 | Hakkaku | B29C 33/442 |

| | | | | |
|---|---|---|---|---|
| 2020/0086574 | A1* | 3/2020 | Budge | B29C 64/118 |
| 2020/0238617 | A1* | 7/2020 | Lambright | B01F 33/4062 |
| 2023/0173757 | A1* | 6/2023 | Matsumura | B33Y 40/20 |
| | | | | 425/375 |

FOREIGN PATENT DOCUMENTS

| | | |
|---|---|---|
| JP | 2013-067116 | 4/2013 |
| JP | 2019-89290 | 6/2019 |
| JP | 2019-093682 | 6/2019 |
| JP | 2019-525856 | 9/2019 |
| WO | WO 2021/220274 | 11/2021 |

OTHER PUBLICATIONS

International Search Report and the Written Opinion Dated Jun. 28, 2021 From the International Searching Authority Re. Application No. PCT/IL2021/050487. (17 Pages).

International Preliminary Report on Patentability Dated Nov. 10, 2022 From the International Bureau of WIPO Re. Application No. PCT/IL2021/050487. (10 Pages).

Communication Pursuant to Article 94(3) EPC Dated Mar. 5, 2025 From the European Patent Office Re. Application No. 21726207.0 (8 Pages).

Notice of Reason(s) for Rejection Dated Jan. 21, 2025 From the Japan Patent Office Re. Application No. 2022-563106 and Its Translation Into English. (10 pages).

Office Action Dated Feb. 6, 2025 From the Israel Patent Office Re. Application No. 297709. (3 Pages).

Notice of Reasons for Rejection Dated Jul. 29, 2025 From the Japan Patent Office Re Application No. 2022-563106 and its Translation into English. (5 Pages).

* cited by examiner

LEVELING SYSTEM FOR THREE-DIMENSIONAL PRINTING

RELATED APPLICATIONS

This application is a National Phase of PCT Patent Application No. PCT/IL2021/050487 having International filing date of Apr. 27, 2021, which claims the benefit of priority under 35 USC § 119(e) of U.S. Provisional Patent Application No. 63/015,728 filed on Apr. 27, 2020. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to a leveling system for three-dimensional printing.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing. 3D inkjet printing is performed by a layer by layer inkjet deposition of building materials. Thus, a building material is dispensed from a dispensing head having a set of nozzles to deposit layers on a supporting structure. The layers are then leveled by a leveling device, and cured or solidified.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 8,784,723, and 9,031,680, all of the same Assignee, the contents of which are hereby incorporated by reference.

SUMMARY OF THE INVENTION

According to an aspect of some embodiments of the present invention there is provided a leveling system for a three-dimensional printing system. The leveling system comprises a rotatable roller, a motor for rotating the roller, a waste collecting bath, a blade for removing liquid waste from the roller into the bath, and a plurality of tubular structures. Each tubular structure has an inlet at a vicinity of a base of the bath and an outlet connectable to a pump system.

According to some embodiments of the invention the base comprises a plurality of separated depression regions, and wherein for each tubular structure, the inlet is in one of the depression regions.

According to some embodiments of the invention the base is a non-planar surface having a wavy shape, and the depression regions are troughs of the wavy shape.

According to some embodiments of the invention the non-planar surface comprises a plurality of oblique segments forming the wavy shape.

According to some embodiments of the invention the leveling system comprises a rotation sensor for generating a signal indicative of the rotation of the roller.

According to some embodiments of the invention the rotation sensor comprises a magnetic sensor. According to some embodiments of the invention the magnetic sensor comprises a Hall-effect sensor.

According to some embodiments of the invention the leveling system comprises a housing connectable to the three-dimensional printing system, wherein at least one of the roller and the waste collecting bath is mounted on the housing.

According to some embodiments of the invention the invention the leveling system comprises an in-place sensor for generating a signal indicative of a mounting of the bath on the housing. According to some embodiments of the invention the in-place sensor comprises a mechanical switch. According to some embodiments of the invention the in-place sensor comprises an optical sensor.

According to some embodiments of the invention at least one of the roller and the waste collecting bath is detachably mounted on the housing by a quick-release mechanism.

According to some embodiments of the invention the quick-release mechanism is selected from the group consisting of an elastic clip connector and a magnetic connector.

According to some embodiments of the invention at least one of the tubular structures is shaped as a siphon.

According to an aspect of some embodiments of the present invention there is provided a printing system for three-dimensional printing. The printing system comprises: an array of nozzles for dispensing building materials; the leveling system as delineated above and optionally and preferably as further detailed below; a pump system connected to the outlets of the tubular structures; and a computerized controller configured for operating at least the array of nozzles.

According to some embodiments of the invention the pump system comprises at least two separate pumps, each connected to a respective outlet of a different tubular structure, and wherein the controller is configured to individually activate and deactivate each of the pumps.

According to some embodiments of the invention printing system comprises a tray for receiving building materials dispensed by the nozzles, wherein a width of a working region of the tray is wider than a length of the array, and wherein a length of the roller is at least the width of the working region.

According to some embodiments of the invention controller is configured to activate and deactivate each of the pumps based on a position of the array relative to the tray.

According to some embodiments of the invention the leveling system comprises an in-place sensor for generating a signal indicative of a placement of the bath below the roller, and wherein the controller is configured to receive the signal from the in-place sensor and generate an alert and/or deactivate the nozzles when the bath is not in place.

According to some embodiments of the invention the leveling system comprises a rotation sensor for generating a signal indicative of the rotation of the roller, and wherein the controller is configured to receive the signal from the rotation sensor and generate an alert and/or deactivate the nozzles when a rotation speed is zero or below a predetermined threshold.

According to some embodiments of the invention the leveling system comprises a housing connected to the three-dimensional printing system, wherein the waste collecting bath is detachably mounted on the housing by a quick-release mechanism.

According to an aspect of some embodiments of the present invention there is provided a method of performing maintenance on the printing system. The method comprises detaching the waste collecting bath from the housing; performing at least one maintenance operation on the bath while being detached; and mounting the waste collecting bath on the housing.

According to an aspect of some embodiments of the present invention there is provided a method of levelling a layer of building material during three-dimensional printing. The method comprises: engaging a top surface of the layer with a rotating roller of the leveling system as delineated above and optionally and preferably as further detailed below, during relative motion between the roller and the layer, thereby collecting excess building material in the bath; and operating the pump system for removing at least a portion of the excess building material from the bath via at least one of the tubular structures.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
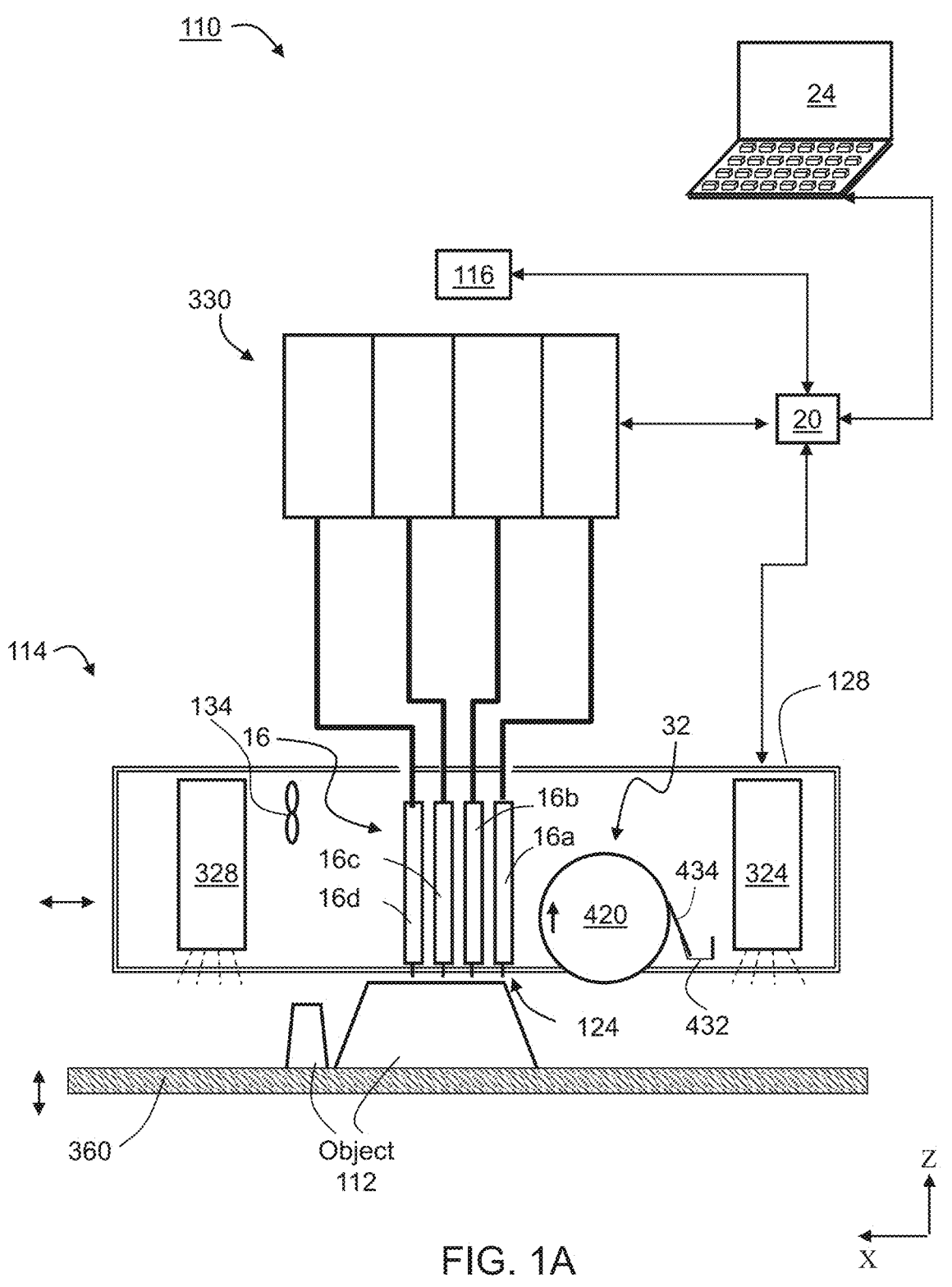
FIGS. 1A-D are schematic illustrations of an additive manufacturing system according to some embodiments of the invention.

The present invention, in some embodiments thereof, relates to three-dimensional printing and, more particularly, but not exclusively, to a leveling system for three-dimensional printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels are separated from each other such that there is no fluid communication therebetween, wherein each channel receives a different building material through a separate inlet and conveys it to a different array of nozzles.

Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different array of nozzles (belonging to the same or different printing heads) of the AM apparatus. In some embodiments, two or more such arrays of nozzles that dispense different modeling materials are both located in the same printing head of the AM apparatus. In some embodiments, arrays of nozzles that dispense different modeling materials are located in separate printing heads, for example, a first array of nozzles dispensing a first modeling material is located in a first printing head, and a second array of nozzles dispensing a second modeling material is located in a second printing head.

In some embodiments, an array of nozzles that dispense a modeling material and an array of nozzles that dispense a support material are both located in the same printing head. In some embodiments, an array of nozzles that dispense a modeling material and an array of nozzles that dispense a support material are both located in separate the same printing head.

Figure 2A:
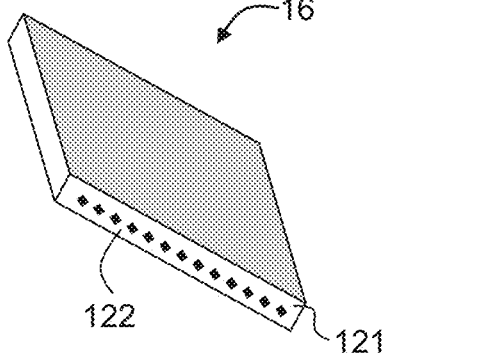
FIGS. 2A-2C are schematic illustrations of printing heads according to some embodiments of the present invention.
Figure 2B:
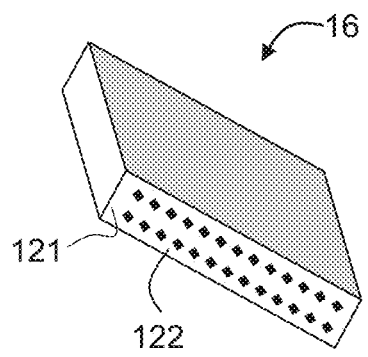
Figure 2C:
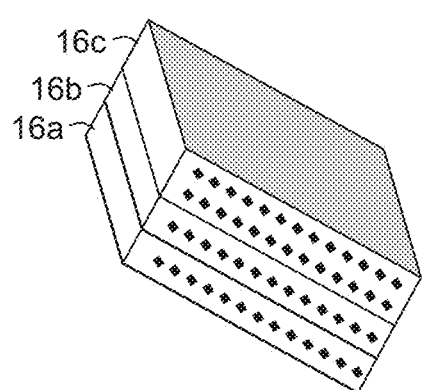

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material 124 is dispensed.

Preferably, but not obligatorily, apparatus 114 is a three-dimensional printing apparatus, in which case the printing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each printing head is optionally and preferably fed via one or more building material reservoirs which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense one modeling material, head 16b can dispense another modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material, e.g. two nozzle arrays for depositing two different modeling materials or a modeling material and a support material, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material, the number of arrays of nozzles that dispense support material, and the number of nozzles in each respective array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout the term "about" refers to ±10%.

For example, for $\alpha=1$, the overall dispensing rate of support material is generally the same as the overall dispensing rate of the modeling material when all the arrays of nozzles operate.

Apparatus 114 can comprise, for example, M modeling heads each having m arrays of p nozzles, and S support heads each having s arrays of q nozzles such that $M \times m \times p = S \times s \times q$. Each of the $M \times m$ modeling arrays and $S \times s$ support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a solidifying device 324 which can include any device configured to emit light, heat or the like that may cause the deposited material to harden.

For example, solidifying device 324 can comprise one or more radiation sources, which can be, for example, an ultraviolet or visible or infrared lamp, or other sources of electromagnetic radiation, or electron beam source, depending on the modeling material being used. In some embodiments of the present invention, solidifying device 324 serves for curing or solidifying the modeling material.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128. Preferably block 128 is mounted above a tray 360, which serves as the working surface, wherein at least one of block 128 and tray 360 is operative to reciprocally move so as to establish a relative reciprocal motion between tray 360 and block 128. In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises a leveling system 32, which can comprise a roller 420 and optionally and preferably also with a blade 434, as further detailed hereinbelow. Leveling system 32 serves to straighten, level and/or establish a thickness of the newly formed layer prior to the formation of the successive layer thereon. Leveling system 32 preferably comprises a waste collection bath 432 for collecting the excess material generated during leveling. Waste collection bath 432 may comprise a mechanism that delivers the material to a waste tank or waste cartridge, as further detailed hereinbelow.

In use, the printing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the printing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the printing heads, the layer thus formed may be straightened by leveling system 32, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A computerized controller 20 controls fabrication apparatus 114 and optionally and preferably also supply system 330. Controller 20 typically includes an electronic circuit configured to perform the controlling operations. Controller 20 preferably communicates with a data processor 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material in the respective printing head or respective nozzle array.

Once the manufacturing data is loaded to controller 20 it can operate without user intervention. In some embodiments, controller 20 receives additional input from the operator, e.g., using data processor 24 or using a user interface 116 communicating with controller 20. User interface 116 can be of any type known in the art, such as, but not limited to, a keyboard, a touch screen and the like. For example, controller 20 can receive, as additional input, one or more building material types and/or attributes, such as, but not limited to, color, characteristic distortion and/or transition temperature, viscosity, electrical property, magnetic property. Other attributes and groups of attributes are also contemplated.

Figures 1B, 1C:
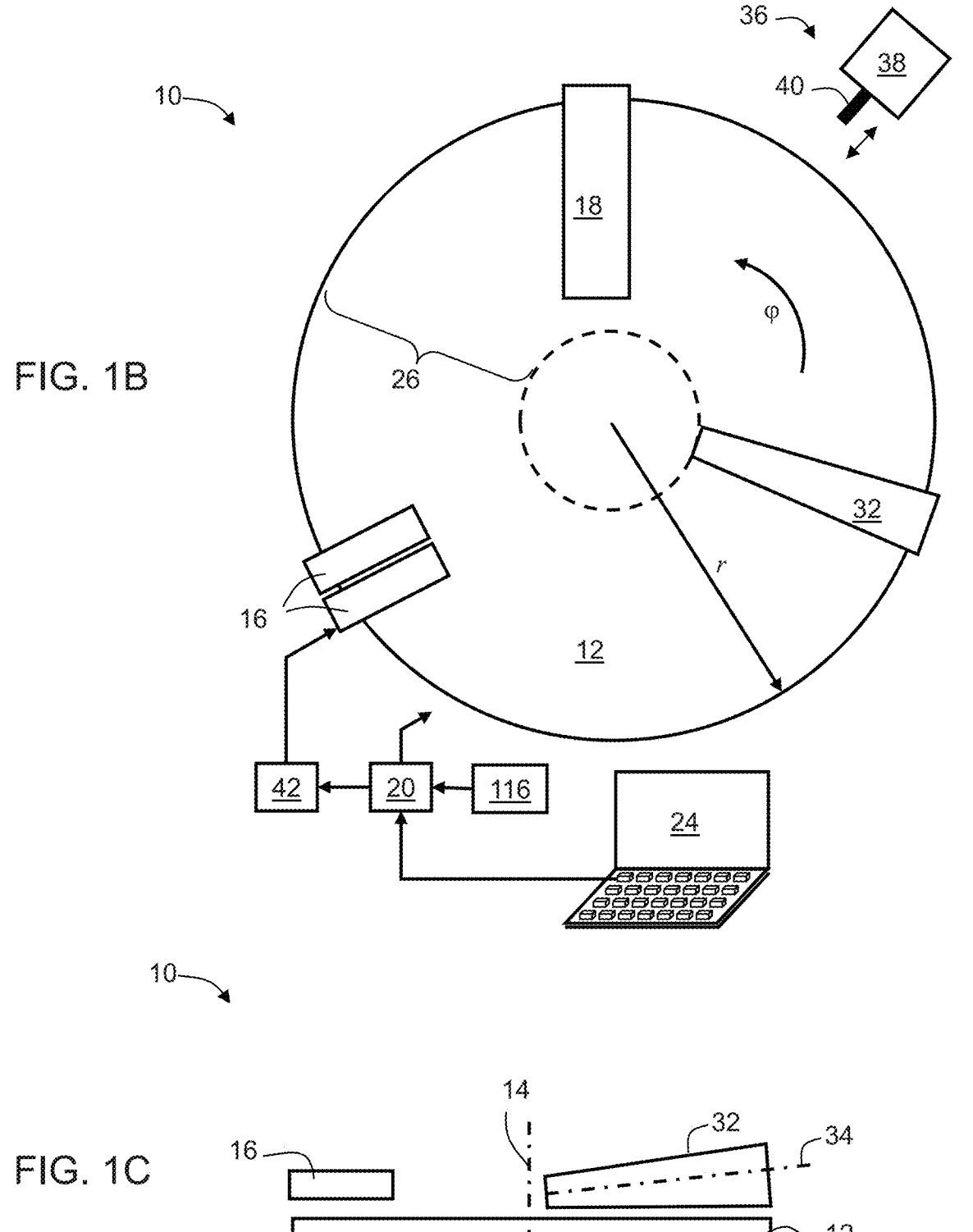
Figure 1D:
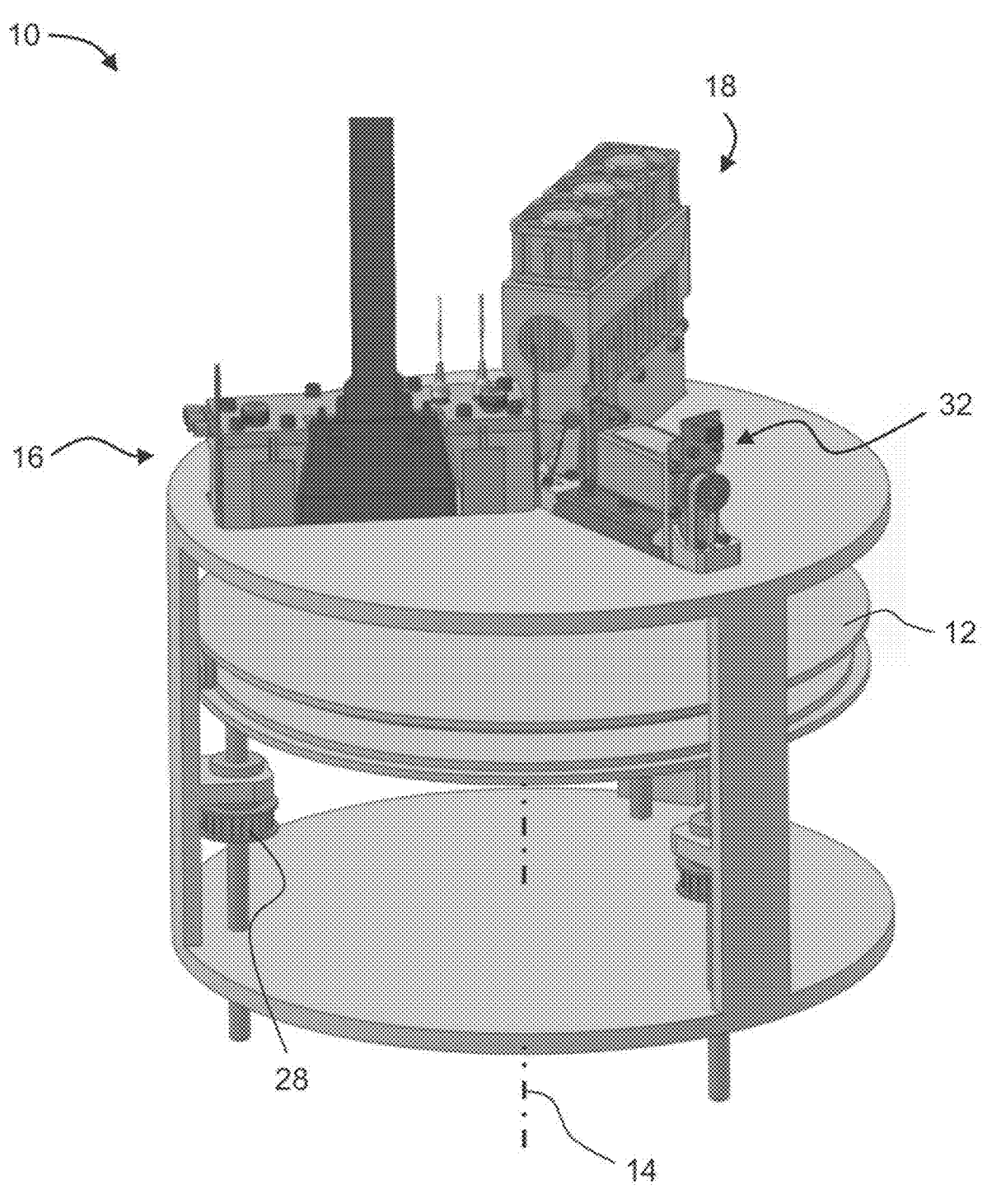

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The radial direction r in system 10 enacts the indexing direction y in system 110, and the azimuthal direction $\varphi$ enacts the scanning direction x in system 110. Therefore, the radial direction is interchangeably referred to herein as the indexing direction, and the azimuthal direction is interchangeably referred to herein as the scanning direction. The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersects the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired.

When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material, or at least two arrays of the same head can be fed with different building materials.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a computerized controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20. Controller 20 can also communicate with user interface 116, as further detailed hereinabove.

Figure 3A:
FIGS. 3A and 3B are schematic illustrations demonstrating coordinate transformations according to some embodiments of the present invention.
Figure 3B:
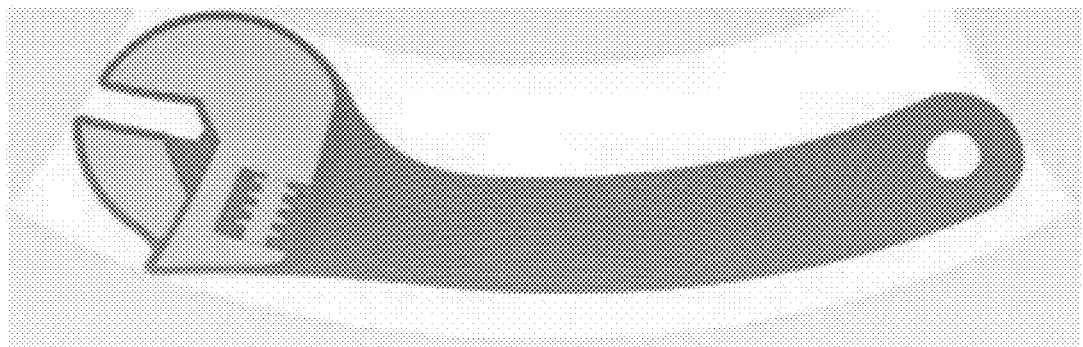

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises leveling system 32 which can comprise a roller optionally and preferably with a blade and optionally also with a waste collection device (not shown, see FIG. 1A), as further detailed hereinbelow. Leveling system 32 serves to straighten the newly formed layer prior to the formation of the successive layer thereon.

In some optional embodiments, leveling system 32 has the shape of a conical roller positioned such that its symmetry axis 34 is tilted relative to the surface of tray 12 and its surface is parallel to the surface of the tray. This embodiment is illustrated in the side view of system 10 (FIG. 1C). The conical roller can have the shape of a cone or a conical frustum.

The operation of leveling system 32 is optionally and preferably controlled by controller 20 which may activate and deactivate leveling system 32. In some optional embodiments, controller 20 controls the position leveling system 32 is along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials may be formed.

In some embodiments of the present invention the system dispenses digital material for at least one of the layers.

The phrase "digital materials", as used herein and in the art, describes a combination of two or more materials on a pixel level or voxel level such that pixels or voxels of different materials are interlaced with one another over a region. Such digital materials may exhibit new properties that are affected by the selection of types of materials and/or the ratio and relative spatial distribution of two or more materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Reference is now made to FIGS. 4A-H which are schematic illustrations showing leveling system 32 in greater detail in accordance with some embodiments of the present invention. Leveling system 32 is useful for leveling layers formed during three-dimensional printing, and can be therefore incorporated in any three-dimensional printing system, preferably, but not necessarily, in system 10 or 110.

Figures 4A, 4B:
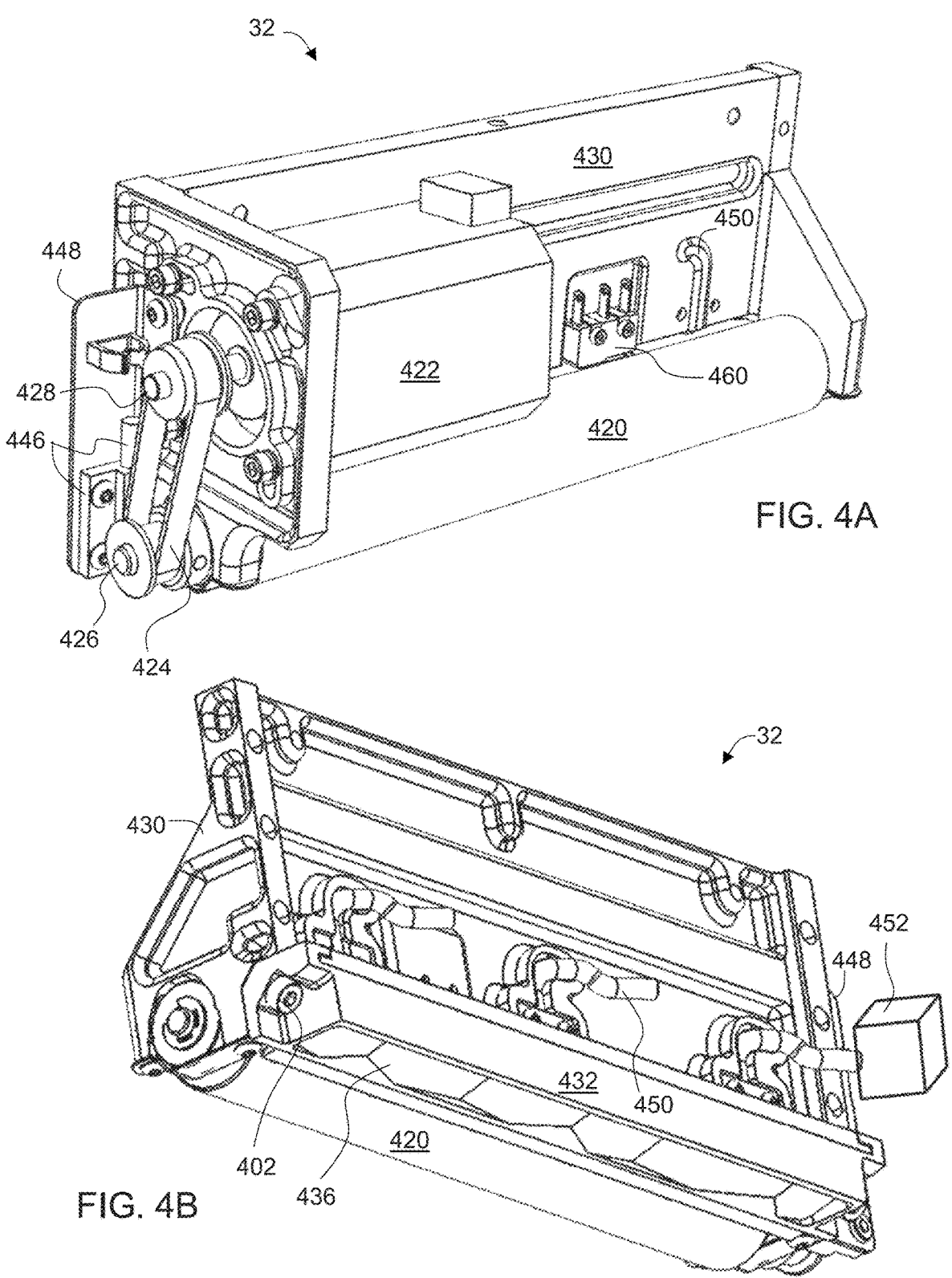
FIGS. 4A-H are schematic illustrations of a leveling system according to some embodiments of the present invention.
Figure 4C:
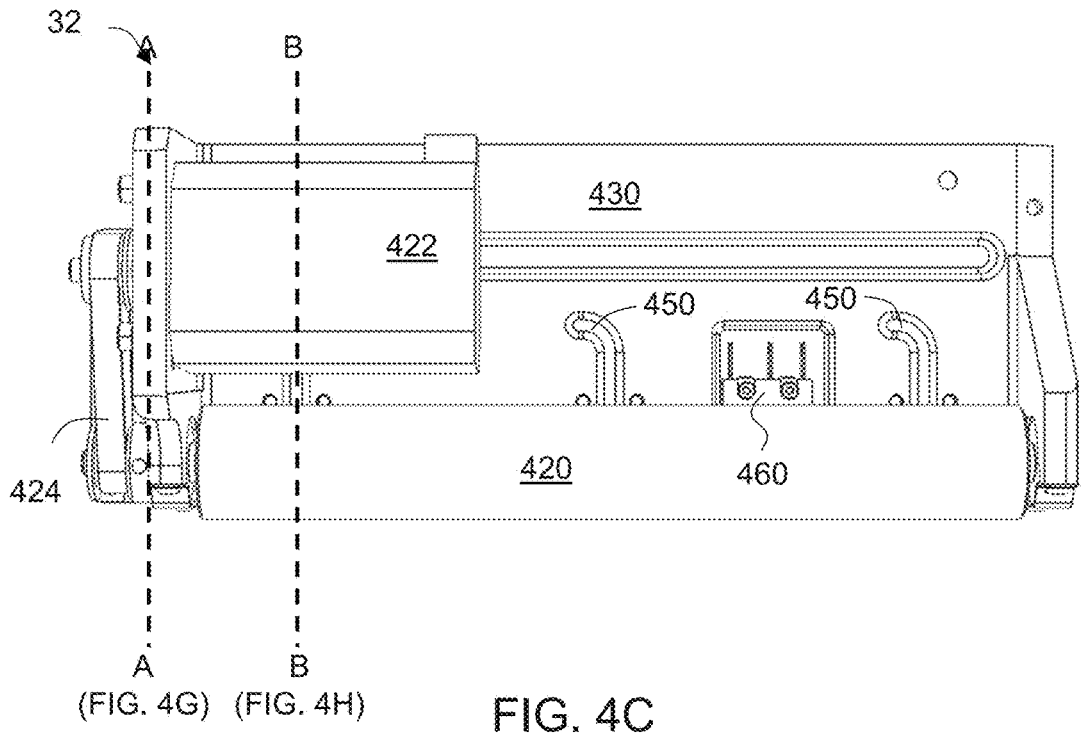
Figure 4D:
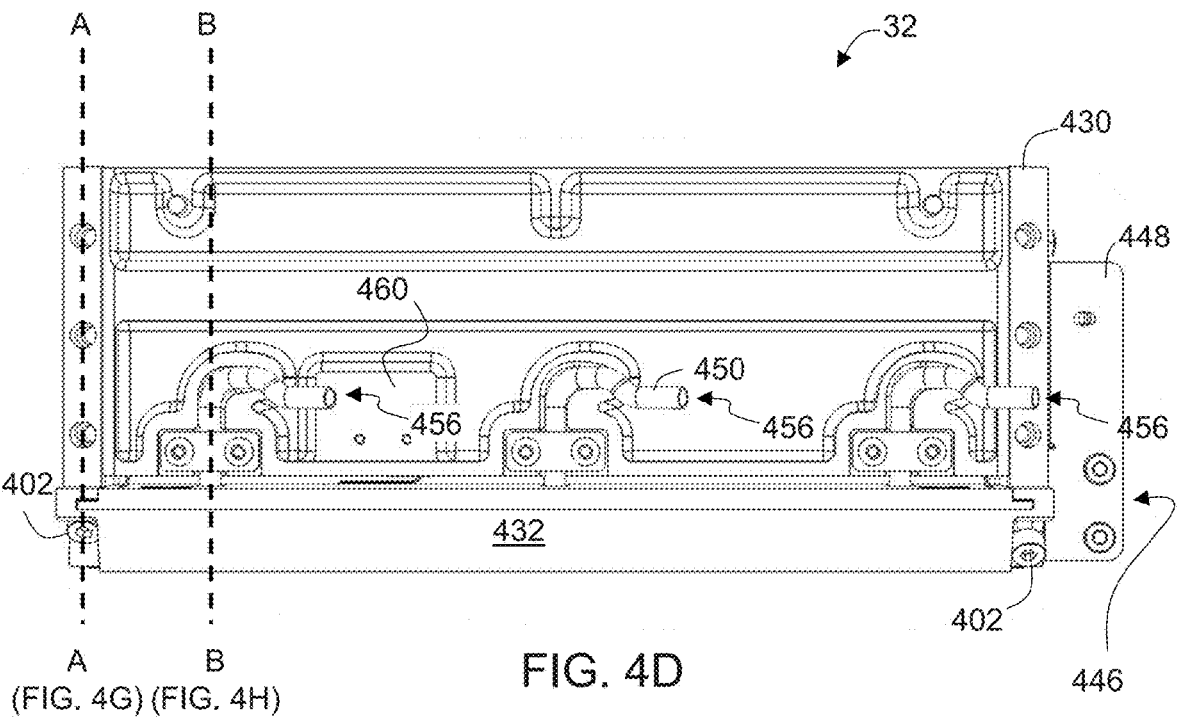
Figure 4E:
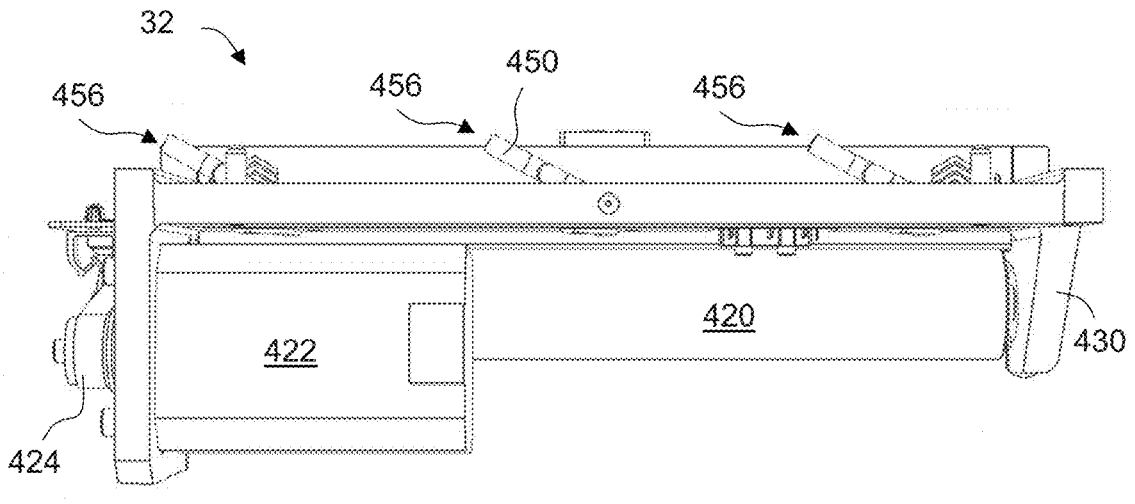
Figure 4F:
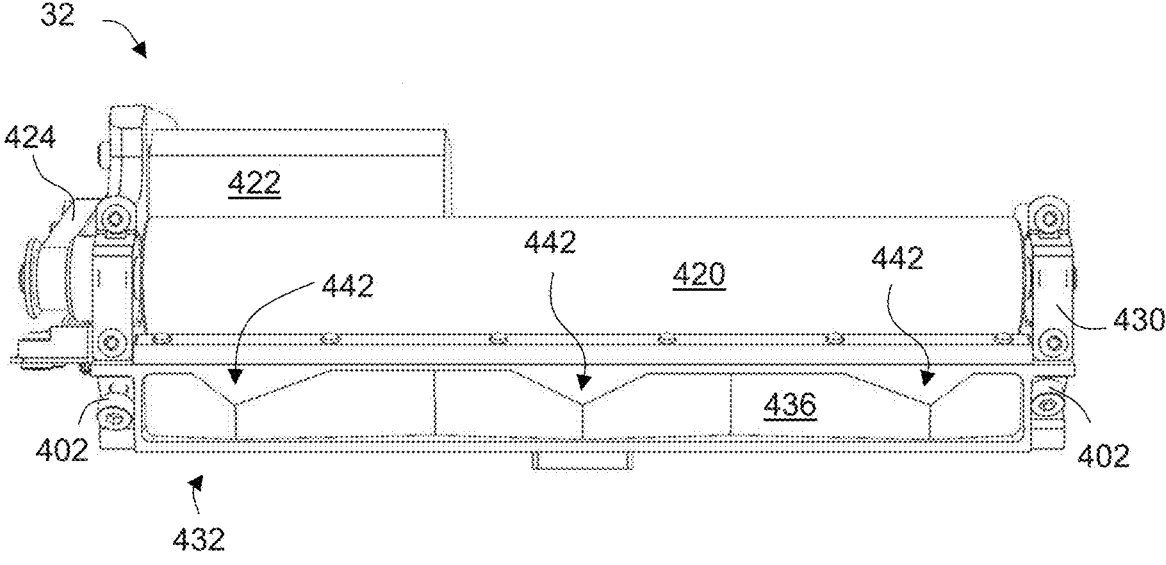
Figure 4G:
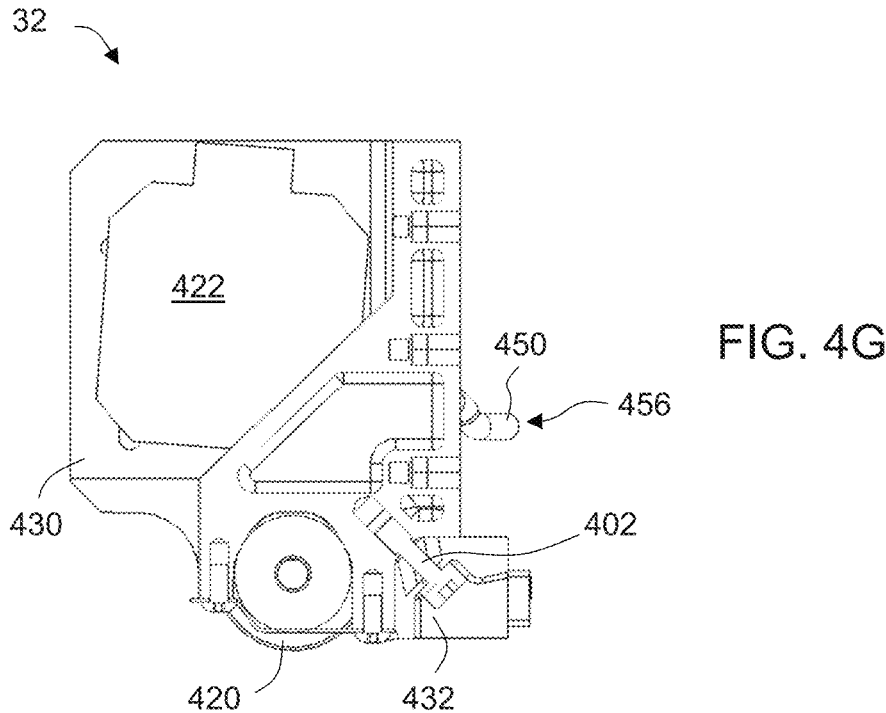
Figure 4H:
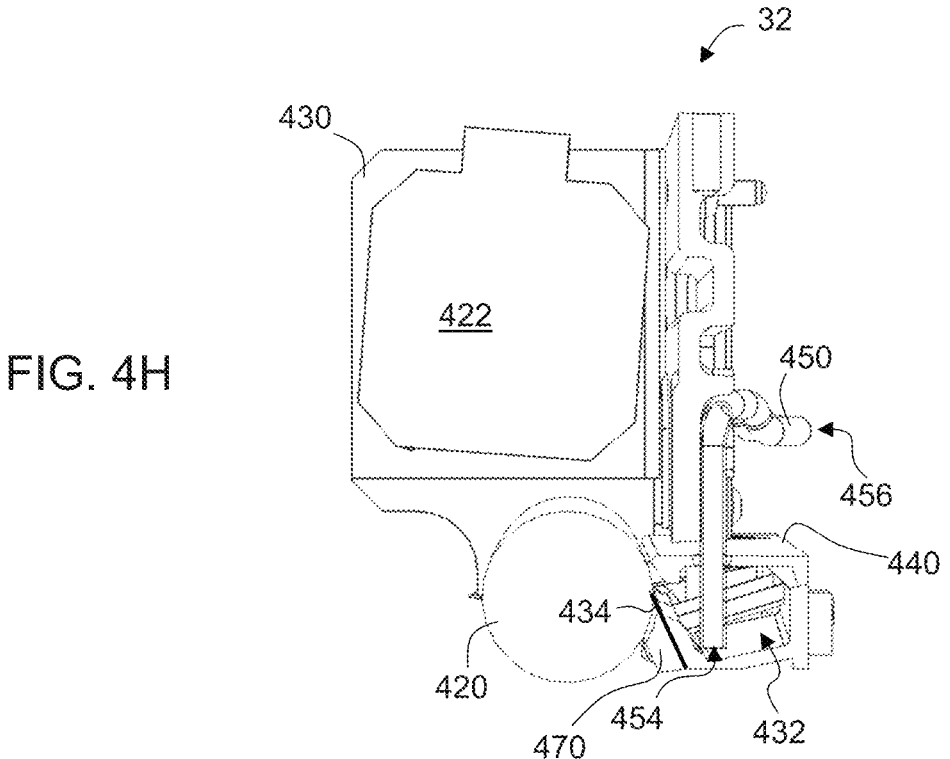

FIGS. 4A and 4B illustrate an upper-front (FIG. 4A) and a lower-rear (FIG. 4B) perspective views of leveling system 32, FIGS. 4C-F illustrate front (FIG. 4C), rear (FIG. 4D), top (FIG. 4E), and bottom (FIG. 4F) views of leveling system 32, FIG. 4G illustrates a cross-sectional view along the cut A-A of FIGS. 4C and 4D, and FIG. 4H illustrates a cross-sectional view along the cut B-B of FIGS. 4C and 4D.

In preferred embodiments of the invention, leveling system 32 comprises a rotatable roller 420, and a motor 422 for rotating roller 420. In the schematic illustration of FIG. 4A, motor 422 is an electrical motor constituted to rotate roller 420 by means of a transmission belt 424 connecting the axis 426 of roller 420 with the axis 428 of motor 422. Preferably, roller 420 and motor 422 are mounted on a leveling system housing 430.

Leveling system 32 also comprises waste collecting bath 432, a blade 434 for removing waste from roller 420 into bath 432, and a plurality of tubular structures 450. Bath 432 is preferably elongated. Preferably, the length of bath 432 is at least the length of roller 420. Tubular structures 450 serve as a mechanism for delivering building material from bath 432 to a waste tank or waste cartridge (not shown), for example, by means of a pump system 452. Thus, each of tubular structures 450 has an inlet 454 at a vicinity of a base 436 of bath 432, and an outlet 456 connectable to pump system 452, which is optionally and preferably controlled by the controller of the printing system (e.g., controller 20). Pump system 452 can be embodied as a single pump with a plurality of inlet ports, e.g., in the form of a manifold, that are connected to the outlets 456 of structures 450. Alternatively, pump system 452 can be embodied as a plurality of separate pumps, wherein two or more of the pumps are connected to a separate tubular structure 450. The operation of pump system 452 according to some embodiments of the present invention will be described hereinunder.

In the schematic illustrations shown in FIGS. 4A-H, bath 432 is mounted on housing 430 by means of screws 402 (see, e.g., FIG. 4G). However, this need not necessarily be the case, since, typically bath 432 is removed periodically from leveling system 232 for maintenance, and so from the standpoint of easy maintenance, a configuration in which bath 432 is connected to housing 430 by means of a quick-release mechanism, such as, but not limited to, an elastic clip connector or a magnetic connector is also contemplated according to some embodiments of the present invention. Preferably, tubular structures 450 are positioned with their inlets 454 in bath 432 without being attached to bath 432. The advantage of these embodiments is that it makes it easier and faster to detach bath 432 from housing 430, because there is no need to uncouple the outlets 456 of tubular structures 450 from pump system 452.

Figure 5A:
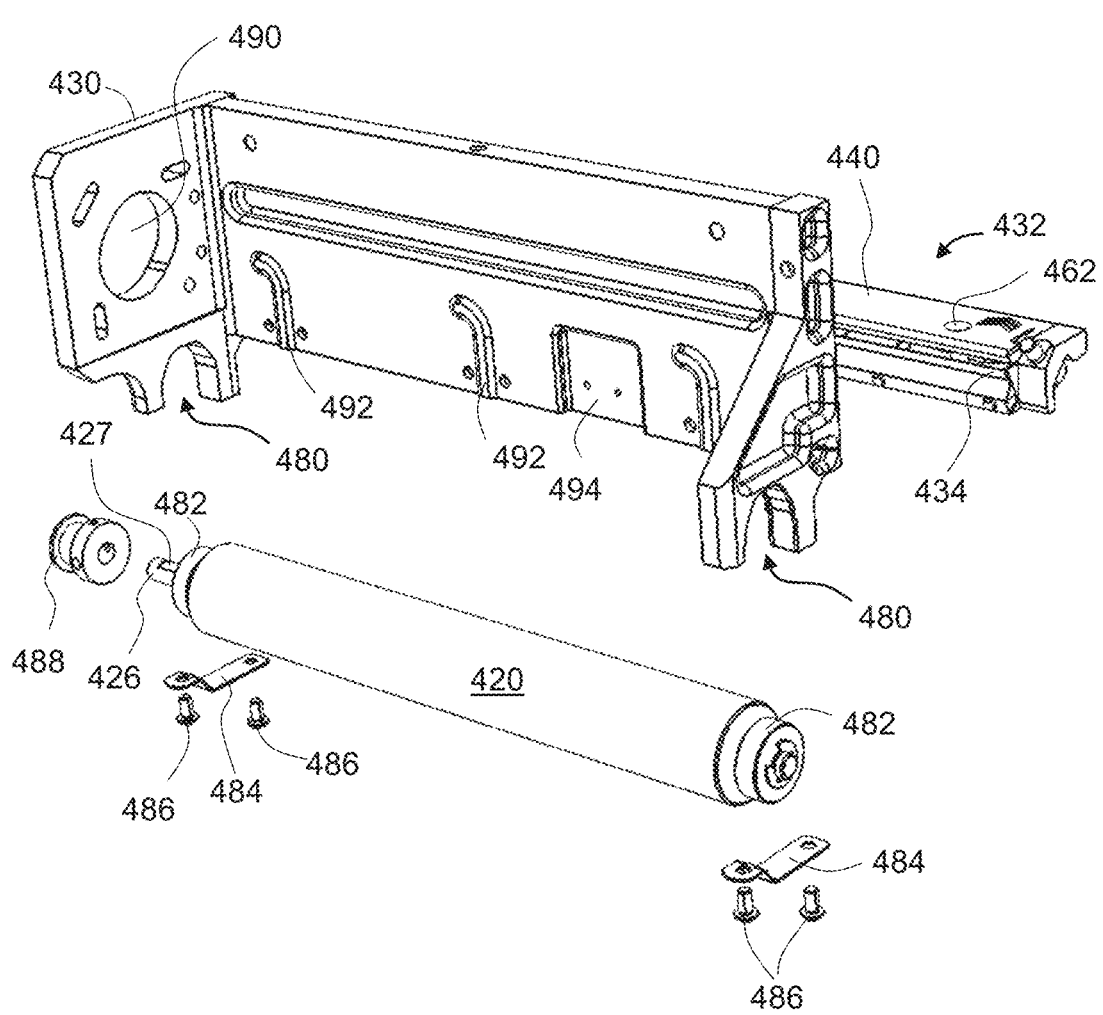
FIG. 5A is a schematic illustration showing an exploded view of a housing, a bath, and a roller of leveling system according to some embodiments of the present invention.
Figures 5B, 5C:
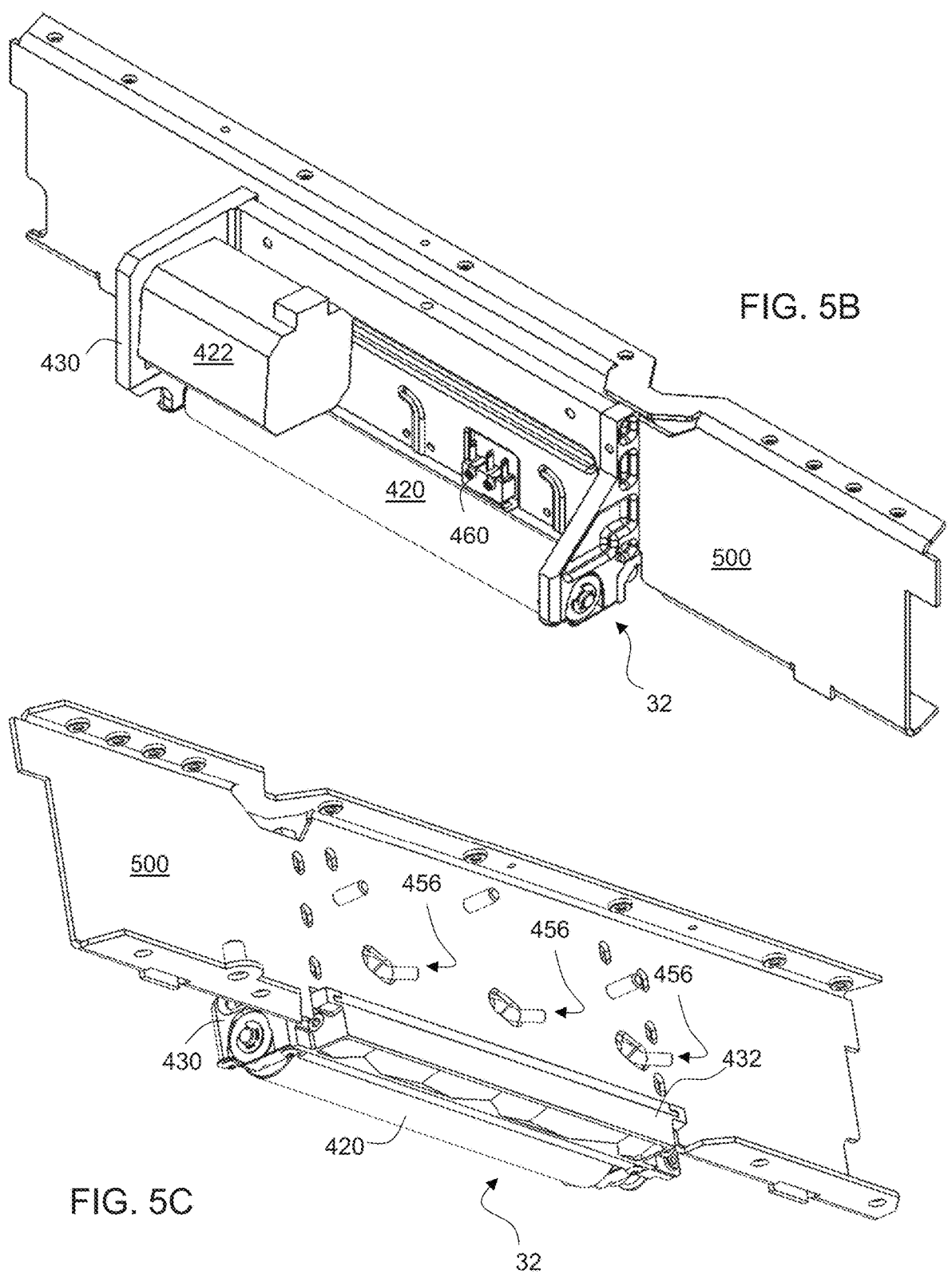
FIGS. 5B and 5C are schematic illustrations showing perspective views of a front side (FIG. 5B) and a rear side (FIG. 5C) of a spar, which can facilitate incorporation of a leveling system with a three-dimensional printing system, according to some embodiments of the present invention.

Exemplified techniques for assembling leveling system 32 and for facilitating the incorporation of leveling system 32 within a three-dimensional printing system (e.g., systems 10 and 110) are illustrated schematically in FIGS. 5A-C.

FIG. 5A is a schematic illustration showing an exploded view of housing 430, bath 432, and roller 420, demonstrating an assembling technique of leveling system 32 according to some embodiments of the present invention. Preferably, leveling system 32 is assembled such that bath 430 is mounted at the rear side of housing 430. Housing 430 is formed with a pair of bearing holders 480 for receiving the bearings 482 of roller 420, an opening 490 for receiving the axis 428 of motor 422, and slots 492 for fixing the tubular structures 450 (see FIG. 5A) in their place. Bearing holders 480 are preferably open at one side (the bottom side, in the present example), in which case the bearings 482 are introduced through the open side of holders 480. Bearings 482 can be secured into bearing holders 480 by means of clips 484, which are optionally and preferably elastic. The advantage of these embodiments is that they allow easy adjustment of the tilt of the axis 426 so that, once installed in the printing system, it assumes a horizontal orientation. Preferably, the tilt adjustment of axis 426 is performed before installing housing 430 in the printing system.

A belt wheel 488 is preferably mounted on axis 426 of roller 420 for providing mechanical association with the rotating axis 428 of motor 422. In the schematic illustrations shown in FIG. 5A, the clips are connected to housing 430 by means of screws 486. However, this need not necessarily be the case, since, in some embodiments clips 484 are of the quick-release type, so as to makes it easier and faster to remove roller 420 for maintenance and replace or install it.

FIGS. 5B and 5C are schematic illustrations showing perspective views of a front side (FIG. 5B) and a rear side (FIG. 5C) of a spar 500, which can be used according to some embodiments of the present invention for mounting leveling system 32 above the tray of the three-dimensional printing system.

Figures 6A, 6B, 6C:
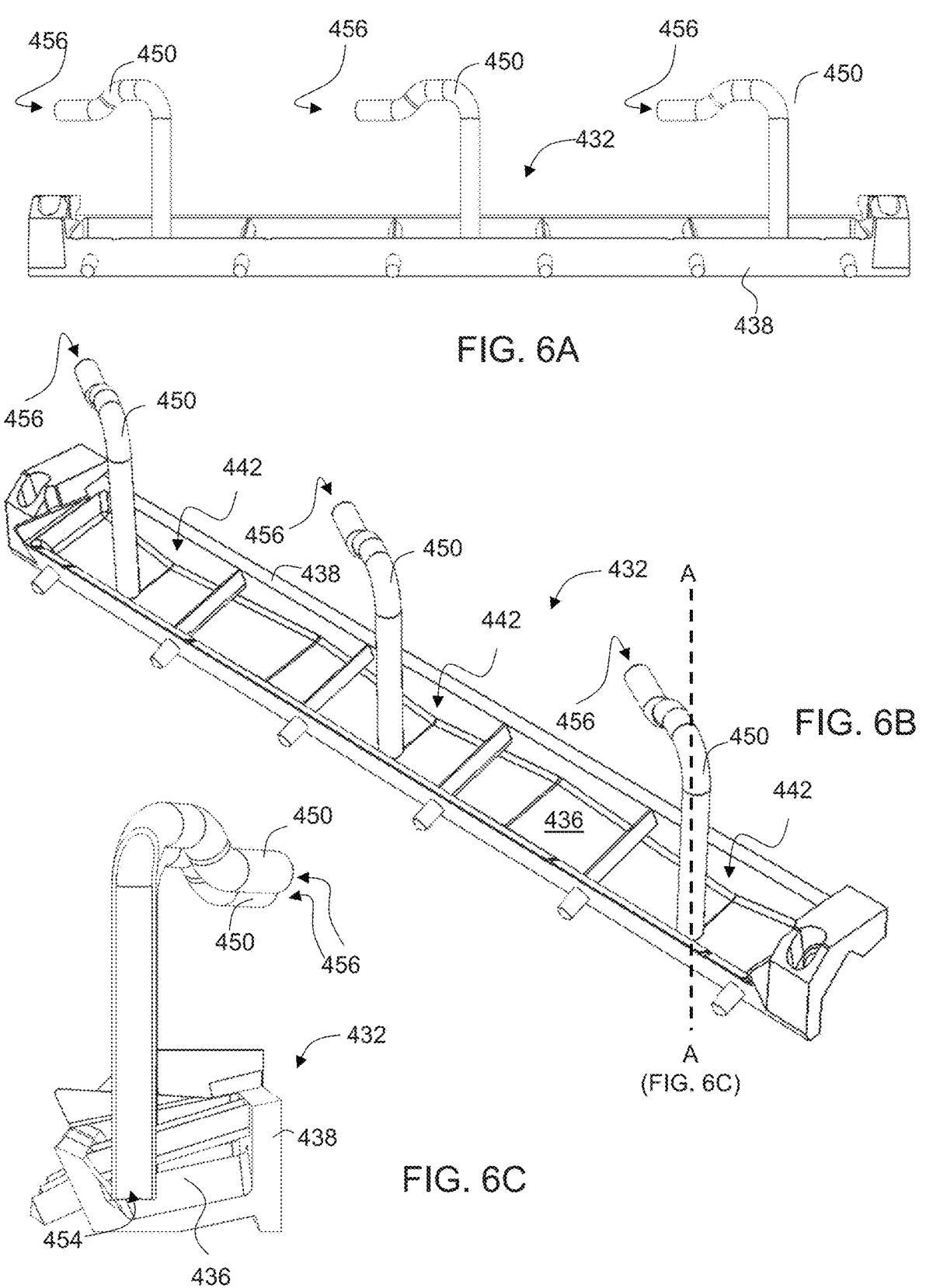
FIGS. 6A-F are schematic illustrations showing a waste collecting bath and tubular structures in greater detail.
Figure 6D:
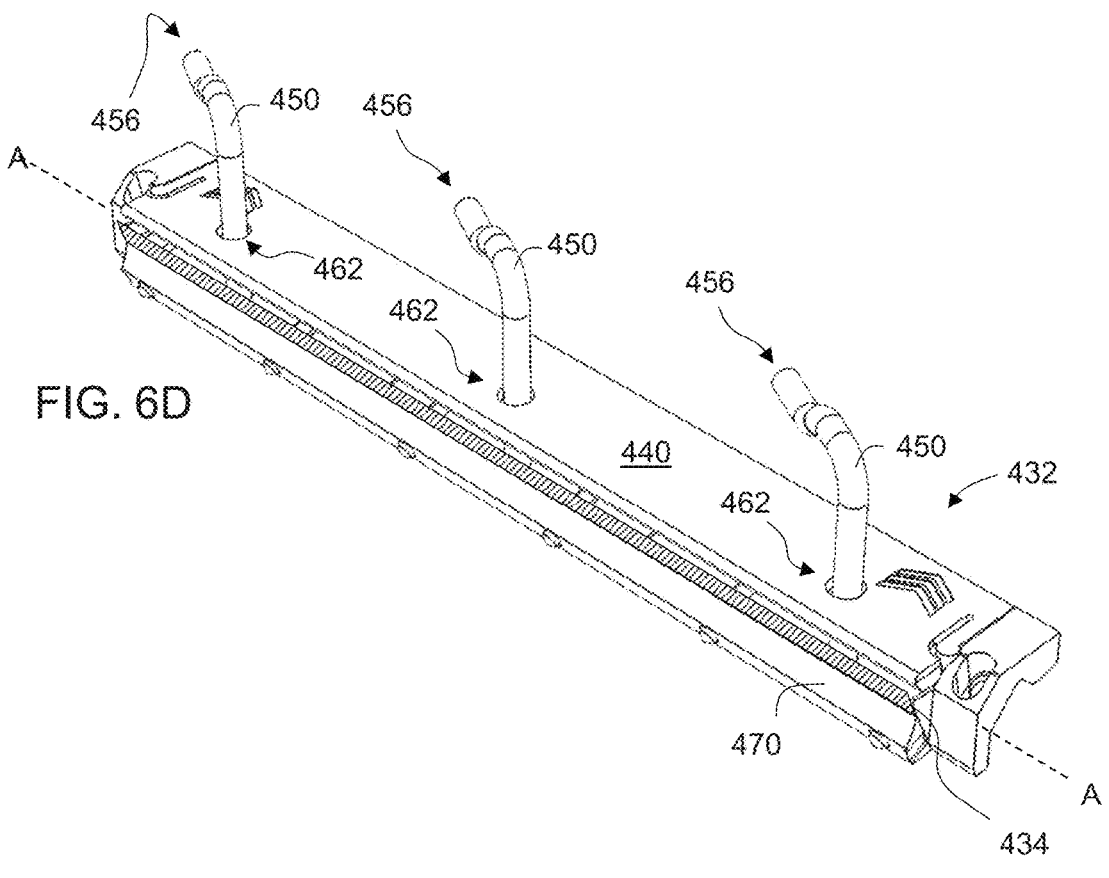
Figure 6E:
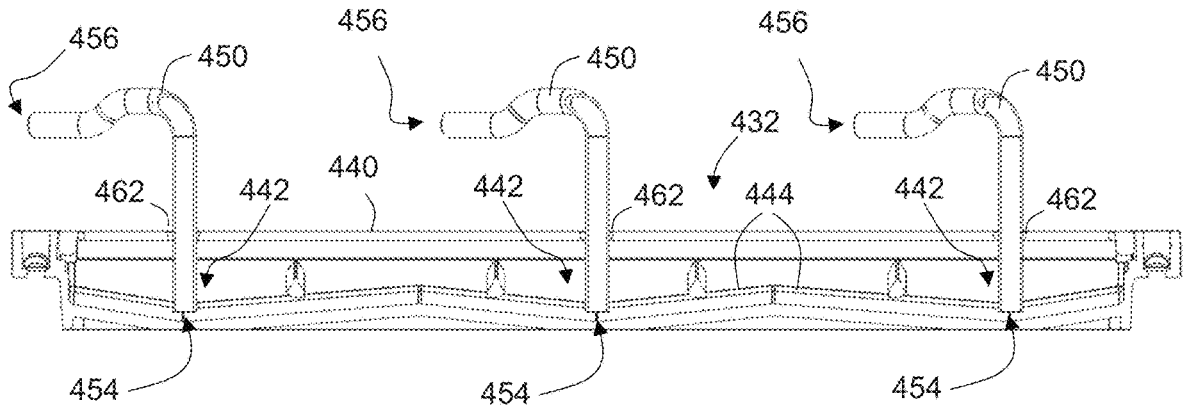
Figure 6F:
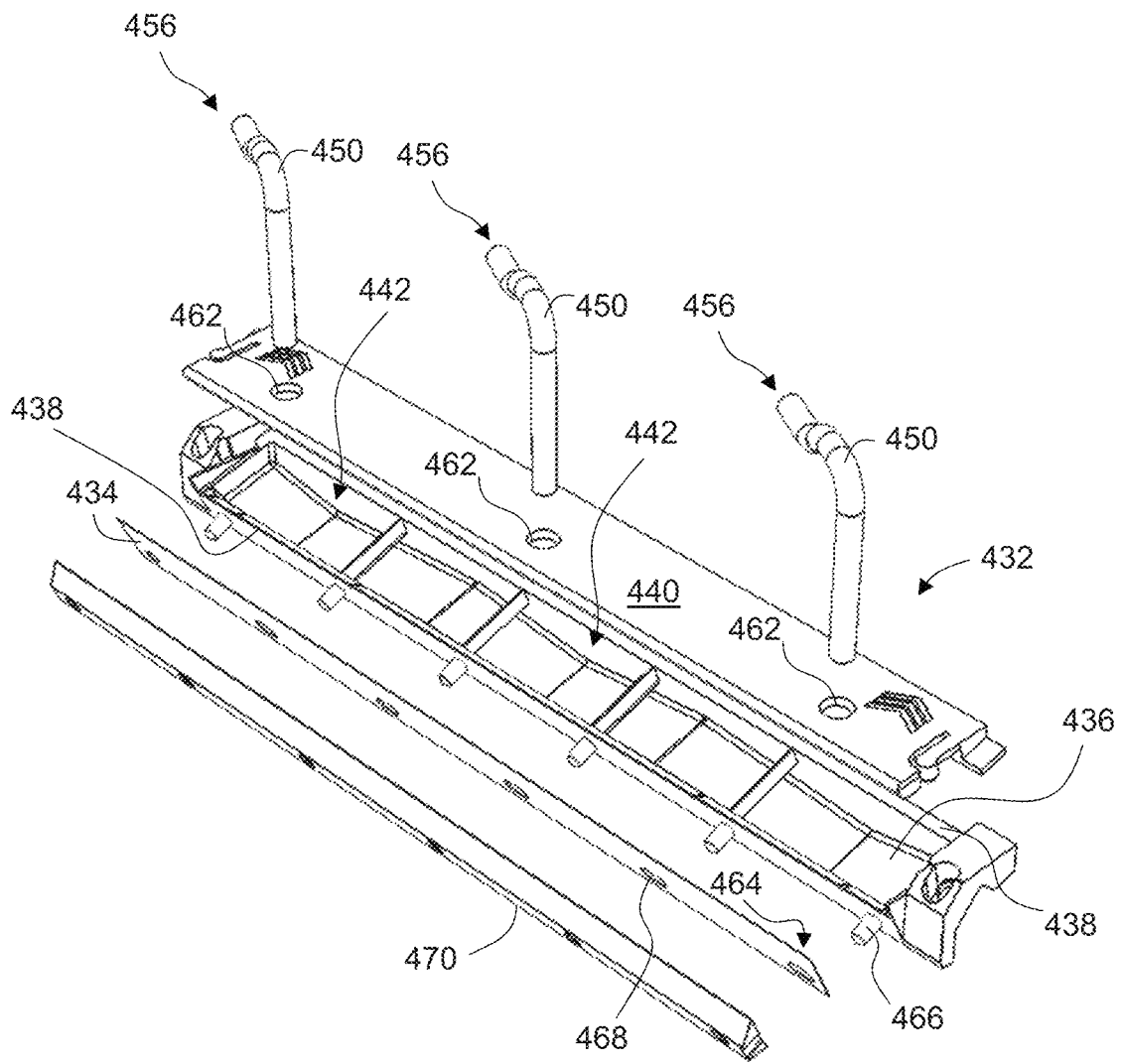

Waste collecting bath 432 and tubular structures 450 are better seen in FIGS. 6A-F. Bath 432 comprises base 436, side walls 438, and optionally and preferably also a cover 440. The advantage of cover 440 is that it can be configured to block radiation from the radiation source of device 324, thereby preventing solidification of the building material collected into bath 432. FIGS. 6A-C illustrate side view (FIG. 6A), perspective view (FIG. 6B) and cross-sectional view (FIG. 6C) along the cut A-A of FIG. 6B of bath 432 without cover 440, and FIGS. 6D-F illustrate a perspective view (FIG. 6D), a cross-sectional view (FIG. 6E) along the cut A-A of FIG. 6D, and an exploded view (FIG. 6F) of bath 432 with cover 440. In embodiments in which bath 432 includes a cover 440, the cover 440 is preferably provided with openings 462 for receiving tubular structures 450.

FIGS. 6A-F illustrate a preferred configuration in which there are three tubular structures 450 along the length of bath 432, but it is to be understood that some embodiments of the present embodiments contemplate configurations with more or less than three tubular structures 450. One or more of tubular structures 450 optionally and preferably is shaped as a siphon. The advantage of these embodiments is that such a shape prevents backflow of remnant liquid in the upper portion of the tubular structure 450 (above the siphon's knee) into bath 432.

With reference to the exploded view illustrated in FIG. 6F, blade 434 is preferably elongated with a blade end 464 that is preferably straight and extending throughout its length. The length of blade 434 is at least the length of roller 420, and optionally and preferably longer than the length of roller 420 (for example, longer by about 1-5 mm). The width of blade 434 can be from about 0.02 to about 0.2 mm, e.g., about 0.05 mm. The angle between the blade and the normal to the surface of roller 420 is preferably from about 50° to about 80°, e.g., about 65°. Preferably the front side wall 438 of bath 432 is provided with pins 466 and blade is provided with a plurality of holes 468 constituted to receive pins 466. The advantage of such a configuration is that the alignment of the blade 434 is ensured once bath 432 is mounted on housing 430. In some embodiments, blade 434 is fixed onto the front side wall 438 by means of an elongated blade holder 470. Blade holder 470 can be attached to wall 438 by any attachment technique, such as welding (e.g., ultrasonic welding), gluing and the like.

In various exemplary embodiments of the invention the base 436 of bath 432 comprises a plurality of separated depression regions 442. In these embodiments, for one or more of the tubular structures 450 (e.g., for each of the tubular structures), the inlet 454 is located in one of depression regions 442, as illustrated in FIG. 6E. Depression regions 442 serve as liquid collectors allowing liquid building material to flow into regions 442 by means of gravity. Depression regions 442 can be constituted in any shape. For example, base 436 can be a non-planar surface having a wavy shape, in which case depression regions 442 are troughs of the wavy shape. The wavy shape need not be curved. In the embodiments illustrated in FIG. 6E, for example, the non-planar surface of base 436 comprises a plurality of oblique segments 444 forming the wavy shape. Other shapes for the depression regions 442 are also contemplated. For example, a depression region 442 can have the shape of a well, with vertical walls, or slanted walls, or stepped walls, or curved walls.

Use of a plurality of the tubular structures 450 at a plurality of different locations on the base 436 is advantageous since it allows flexibility in the way that the waste is evacuated. When pump system 452 comprises a single pump connected to the outlets of all the tubular structures, the suction operation of the single pump generates an under-pressure simultaneously in all tubular structures, thereby evacuating the waste from all the regions of base 436. When pump system 452 comprises two or more separate pumps that are connected to a separate tubular structure 450, the separate pumps can be operated collectively or, more preferably individually. When the pumps are operated collectively, the situation is similar to the situation in which a single pump is employed, wherein an under-pressure is generated simultaneously in all tubular structures, except that different pressure levels can be applied to different tubular structures.

When the pumps are operated individually, the controller can activate some of the pumps and deactivate other pumps according to a predetermined protocol. For example, when a width of a layer formed on a working region of the tray of the printing system (e.g., tray 12 of system 10 or tray 360 of system 110) is wider than the length of the nozzle array that dispenses the building material, more than one dispensing pass is required to complete the layer, wherein each pass the nozzle array is displaced along the indexing direction. On the other hand, roller 420 can be made sufficiently long so that its length is at least the width of the working region of the tray (see e.g., working region 26 in FIG. 1B), so that it is not required to displace the roller along the indexing direction (the r direction in FIG. 1B) between dispensing passes. In this case, at each pass, there is a segment of roller 420 that does not contact building material, and consequently there is a segment of base 436 that does not receive waste.

According to some embodiments of the present invention, the pump that is connected to the outlet of a tubular structure that has an inlet in those segments of base 436 that do not receive waste is not operated. This can be ensured by synchronizing the operation of the pumps of pump system 452 with the position of the nozzle array relative to the tray. Thus, according to some embodiments of the present invention the controller of the printing system (e.g., controller 20) activates the pump or pumps that are connected to tubular structures that have inlets at locations along the indexing direction that are within the range along the indexing direction that is covered by the nozzle array. The advantage of this operation protocol is that it saves energy and lengthens the inter-maintenance period.

Referring again to FIGS. 4A-H, in some embodiments of the present invention, levelling system 32 comprises a rotation sensor 446 (see FIGS. 4A and 4D) for generating a signal indicative of a rotation of roller 420. Sensor 446 is optionally and preferably mounted on housing 430 by means of a bracket 448 or any other type of supporting structure. The signal generated by sensor 446 is transmitted to the controller of the three-dimensional printing system (e.g., controller 20 of system 10 or 110). Responsively to the signal from sensor 446, the controller can activate, deactivate, or otherwise modify, the operation of one or more components of the printing system. Typically, when the rotation speed of roller 420 is zero or non-zero, but below a predetermined threshold, the controller issues an alert signal, for example, by means of user interface 116, and optionally and preferably also terminates the printing job (e.g., by deactivating all the nozzles in the array, and terminating the relative motion between the printing block and the tray). The predetermined threshold can be, for example, selected based on the rotation speed of motor 422 (e.g., the rotation speed of the motor, or 90% of the rotation speed of motor, etc.).

The present embodiments contemplate a rotation sensor that comprises a magnetic field sensor, such as, but not limited to, a Hall-effect sensor or Giant Magneto Resistive sensor. In these embodiments, a permanent magnet 427 is optionally and preferably mounted on the axis 426 of roller 420, wherein the rotation sensor 446 is responsive to changes in the magnetic field generated by magnet 427.

Alternatively, the rotation sensor can be an optical sensor, such as, but not limited to, an optical encoder, or an electromechanical sensor, such as, but not limited to, a conductive encoder.

In some embodiments of the present invention, leveling system 32 comprises an in-place sensor 460 (see FIGS. 4A and 4C) for generating a signal indicative of a mounting of bath 432 on housing 430. The signal generated by sensor 460 is transmitted to the controller of the three-dimensional printing system (e.g., controller 20 of system 10 or 110). Responsively to the signal from sensor 460, the controller can activate, deactivate, or otherwise modify, the operation of one or more components of the printing system. Typically, when the signal from sensor 460 indicates that bath 432 is not in its place (e.g., absent or not properly mounted on the housing 430) the controller issues an alert signal, for example, by means of user interface 116, and optionally and preferably also terminates the printing job (e.g., by deactivating all the nozzles in the array, and terminating the relative motion between the printing block and the tray).

In-place sensor 460 is preferably mounted on housing 430 in the vicinity of bath 432, e.g., in a niche 494 (see FIG. 5A) constituted to receive the in-place sensor 460, and can be of any type, including, without limitation, an electromechanical switch or an optical sensor.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A leveling system for a three-dimensional printing system, the leveling system comprising a rotatable roller, a motor for rotating said roller, a waste collecting bath having a base shaped as a wavy non-planar surface defining separated depression regions, a blade for removing liquid waste from said roller into said bath, and a plurality of tubular structures;

wherein each tubular structure has an inlet in one depression region of said wavy non-planar surface and an outlet connectable to a pump system, and wherein at least one of said tubular structures is shaped as a siphon having an apex between said inlet and said outlet that is connectable to said pump system.

2. The system according to claim 1, wherein said non-planar surface comprises a plurality of oblique segments forming said wavy shape.

3. The system according to claim 1, further comprising a rotation sensor for generating a signal indicative of said rotation of said roller.

4. The system according to claim 3, wherein said rotation sensor comprises a magnetic sensor.

5. The system according to claim 4, wherein said magnetic sensor comprises a Hall-effect sensor.

6. The system according to claim 1, comprising a housing connectable to the three-dimensional printing system, wherein at least one of said roller and said waste collecting bath is mounted on said housing.

7. The system according to claim 6, further comprising an in-place sensor for generating a signal indicative of a mounting of said bath on said housing.

8. The system according to claim 7, wherein said in-place sensor comprises a mechanical switch.

9. The system according to claim 7, wherein said in-place sensor comprises an optical sensor.

10. The system according to claim 6, wherein at least one of said roller and said waste collecting bath is detachably mounted on said housing by a quick-release mechanism.

11. The system according to claim 10, wherein said quick-release mechanism is selected from the group consisting of an elastic clip connector and a magnetic connector.

12. A system for three-dimensional printing, comprising:
an array of nozzles for dispensing building materials;
the leveling system according to claim 1;
a pump system connected to said outlets of said tubular structures; and
a computerized controller configured for operating at least said array of nozzles.

13. The system according to claim 12, wherein said pump system comprises at least two separate pumps, each connected to a respective outlet of a different tubular structure, and wherein said controller is configured to individually activate and deactivate each of said pumps.

14. The system according to claim 13, comprising a tray for receiving building materials dispensed by said nozzles, wherein a width of a working region of said tray is wider than a length of said array, and wherein a length of said roller is at least said width of said working region.

15. The system according to claim 14, wherein said controller is configured to activate and deactivate each of said pumps based on a position of said array relative to said tray.

16. The system according to claim 12, wherein said leveling system comprises an in-place sensor for generating a signal indicative of a placement of said bath below said roller, and wherein said controller is configured to receive said signal from said in-place sensor and generate an alert and/or deactivate said nozzles when said bath is not in place.

17. The system according to claim 12, wherein said leveling system comprises a rotation sensor for generating a signal indicative of said rotation of said roller, and wherein said controller is configured to receive said signal from said rotation sensor and generate an alert and/or deactivate said nozzles when a rotation speed is zero or below a predetermined threshold.

18. The system according to claim 12, wherein the leveling system comprises a housing connected to the three-dimensional printing system, wherein said waste collecting bath is detachably mounted on said housing by a quick-release mechanism.

19. A method of performing maintenance on the system according to claim 18, comprising:
detaching said waste collecting bath from said housing;
performing at least one maintenance operation on said bath while being detached; and
mounting said waste collecting bath on said housing.

20. A method of levelling a layer of building material during three-dimensional printing, the method comprising:
engaging a top surface of the layer with the rotatable roller of the leveling system according to claim 1, during relative motion between said roller and said layer, thereby collecting excess building material in said bath; and
operating the pump system for removing at least a portion of said excess building material from said bath via at least one of said tubular structures.

* * * * *